(12) United States Patent
Khinkis et al.

(10) Patent No.: US 6,467,402 B1
(45) Date of Patent: Oct. 22, 2002

(54) FOSSIL FUEL-FIRED BOILERLESS STEAMER

(75) Inventors: Mark J. Khinkis, Morton Grove; James T. Cole, Algonquin; Donald E. Fritzsche, Chicago Heights; M. Frank G. Johnson, Elmhurst, all of IL (US)

(73) Assignee: Gas Research Institute, Des Plaines, IL (US)

( * ) Notice: Subject to any disclaimer, the term of this patent is extended or adjusted under 35 U.S.C. 154(b) by 0 days.

(21) Appl. No.: 09/834,230

(22) Filed: Apr. 12, 2001

(51) Int. Cl.[7] .............................. A47J 37/12; F24D 1/00; F24C 1/16
(52) U.S. Cl. ................. 99/417; 126/369; 126/275 R; 126/39 R; 426/510; 426/511
(58) Field of Search .................. 99/417, 410, 415; 126/369, 20, 275 R, 39 R, 41 R; 426/511, 510, 523

(56) References Cited

U.S. PATENT DOCUMENTS

| | | | |
|---|---|---|---|
| 1,006,903 A | * 10/1911 | Bird | 126/275 R |
| 1,711,631 A | * 5/1929 | Burnett | 126/275 R |
| 4,649,811 A | * 3/1987 | Manganese | 126/369 |
| 5,682,873 A | * 11/1997 | Chambers | 126/261 |
| 5,901,642 A | 5/1999 | Su | |

FOREIGN PATENT DOCUMENTS

| | | |
|---|---|---|
| GB | 2281027 | 2/1995 |
| GB | 2347992 | 9/2000 |

* cited by examiner

*Primary Examiner*—Reginald L. Alexander
(74) *Attorney, Agent, or Firm*—Mark E. Fejer

(57) ABSTRACT

A fossil fuel-fired apparatus for steaming food having at least one housing wall forming a housing, a steam chamber disposed within the housing and forming an annular space between the steam chamber and the housing wall, and at least one fossil fuel burner disposed beneath the bottom portion of the steam chamber and oriented to produce steam from water in a bottom portion of the steam chamber. Disposed within the annular space are guides for directing the hot products of combustion generated by the burners along the exterior wall surface of the steam chamber, thereby maintaining the temperature of the steam chamber walls above the temperature of the saturated steam and preventing condensation of the steam in the steam chamber.

19 Claims, 2 Drawing Sheets

FOSSIL FUEL-FIRED BOILERLESS STEAMER

BACKGROUND OF THE INVENTION

1. Field of the Invention

This invention relates to fossil-fuel fired steamers used in the preparation of foods. More particularly, this invention relates to a fossil fuel-fired boilerless steamer used in steaming foods such as potatoes and other vegetables.

2. Description of Prior Art

In some steamers being manufactured and in use today, steam is generated in a separate boiler and transported to the steamer. There are, however, steamers which generate steam directly in the steam chamber known as boilerless steamers.

Boilerless steamers are devices in which a steam chamber is disposed within a housing and water disposed in the lower portion of the steam chamber is heated to a temperature suitable for producing steam. Food items to be steamed are placed in the steam chamber.

Boilerless steamers currently being manufactured and in use utilize electricity as a source of heat. In these conventional steamers, the steam chamber is heated by electric heating elements disposed beneath the bottom of the steam chamber. The heat transferred to the steam chamber heats the water in the lower portion of the steam chamber, producing steam. One problem with these conventional steamers is the tendency of the steam, when it comes in contact with the walls of the steam chamber, to condense, reducing heat transfer to the product and steamer productivity and negatively impacting product quality. In conventional electrically heated boilerless steamers, this problem is addressed by the use of electric heating tapes positioned around and in contact with the upper portions of the steam chamber. The heating tapes heat the upper portions of the steam chamber, resulting in maintaining wall temperatures slightly above the saturated steam temperature, thereby substantially preventing its condensation. The desirability of using natural gas or some other fossil fuel instead of electricity and of eliminating the use of electric heating tapes from both capital and operating cost perspectives is apparent.

SUMMARY OF THE INVENTION

Accordingly, it is one object of this invention to provide a fossil fuel-fired boilerless steamer so as to eliminate the use of electricity for steam generation, thereby increasing the overall thermal efficiency and reducing operating costs of the boilerless steamer compared to conventional boilerless steamers.

It is another object of this invention to provide a boilerless steamer which addresses the problem of steam condensation without employing electric heating tapes, thereby further increasing its thermal efficiency and reducing capital and operating costs.

These and other objects of this invention are addressed by an apparatus comprising at least one outer wall forming a housing, at least one inner wall disposed within the housing and forming a steam chamber having an interior wall surface and an exterior wall surface, whereby an annular space is formed between the exterior wall surface and the at least one outer wall, at least one fossil fuel burner disposed within the housing beneath the bottom of the steam chamber by which products of combustion from the burning of a fossil fuel are generated in the annular space, and exhaust means for exhausting the products of combustion generated by the at least one burner from the annular space. In accordance with one preferred embodiment of this invention, the at least one burner is a gaseous fuel-fired burner.

To produce steam in the boilerless steamer of this invention, water is introduced into a lower portion of the steam chamber and a mixture of a gaseous fuel and an oxidant is burned in a portion of the annular region disposed beneath the bottom of the steam chamber, forming products of combustion and forming steam from the water in the lower portion of the steam chamber. The upper portion of the exterior of the steam chamber is contacted with hot products of combustion, resulting in heating of the walls of the upper portion of the steam chamber, after which the products of combustion are exhausted from the steamer housing through a pipe located above the upper portion of the steam chamber.

BRIEF DESCRIPTION OF THE DRAWINGS

These and other objects and features of this invention will be better understood from the following detailed description taken in conjunction with the drawings wherein.

DETAILED DESCRIPTION OF PRESENTLY PREFERRED EMBODIMENTS

Figure 1:
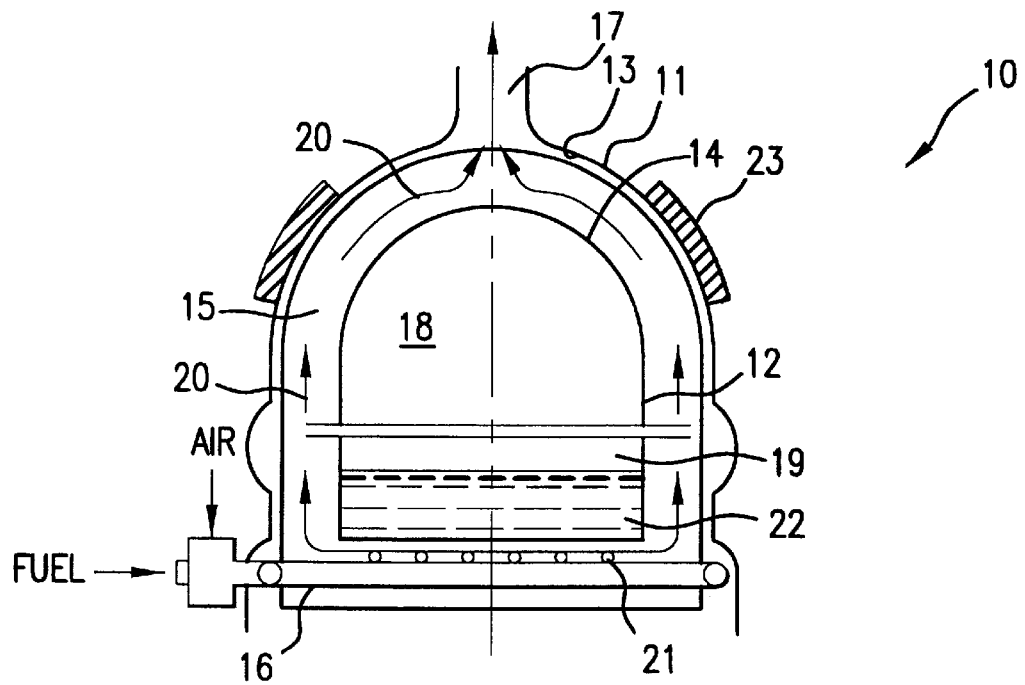
FIG. 1 is a lateral cross-sectional view of a boilerless steamer in accordance with one embodiment of this invention.

FIG. 1 shows a lateral cross-sectional view of a boilerless steamer 10 in accordance with one embodiment of this invention comprising an outer wall which constitutes housing 11 in which is disposed steam chamber 12 having an upper portion 18 and a lower portion 19. Steam chamber 12 is constructed of a material such as metal which is capable of a high rate of heat transfer. Annular space 15 is formed between the interior wall surface 13 of housing 11 and the exterior wall surface 14 of steam chamber 12. Disposed within annular space 15 beneath steam chamber 12 is at least one fossil fuel burner 16. Fossil fuel burner 16 is preferably a gaseous fuel burner. To provide a substantially even distribution of heat generated by the combustion of fuel by burner 16 as well as providing flame stabilization and combustion efficiency, at least one bluffbody 21 is disposed between burner 16 and the bottom of steam chamber 12. At least one such bluffbody 21 is provided for each burner 16. Preferably, the exterior of housing 11 is covered with insulation 23 to enhance the thermal efficiency of the steamer.

In operation, fossil fuel and air are introduced into burner 16 and burned in annular space 15 beneath the bottom of steam chamber 12. Water 22 disposed in the lower portion 19 of steam chamber 12 is heated, resulting in the formation of steam in upper portion 18 of steam chamber 12. Products to be heated, such as food items, are placed into upper portion 18 of steam chamber 12 through a door (not shown) along one side of steam chamber 12.

As previously stated, when the steam above the water level in steam chamber 12 contacts the walls of steam chamber 12, there is a tendency for it to condense. To prevent this from occurring, means for preheating the walls of steam chamber 12 above the water level in chamber 12 are provided. Although any means suitable for preheating the walls may be employed, including electrical heating tapes, the walls are preferably preheated by non-electric means. In accordance with one particularly preferred embodiment, the walls above the water level in steam chamber 12 are preheated by the products of combustion from burner 16 flowing through annular space 15 as indicated by arrows 20 in contact with exterior wall surface 14 of steam chamber 12. The products of combustion, having been cooled by virtue of the transfer of heat to the exterior wall surface 14 of steam chamber 12, can then be exhausted through combustion products exhaust 17 formed in the top of housing 11.

Figure 2:
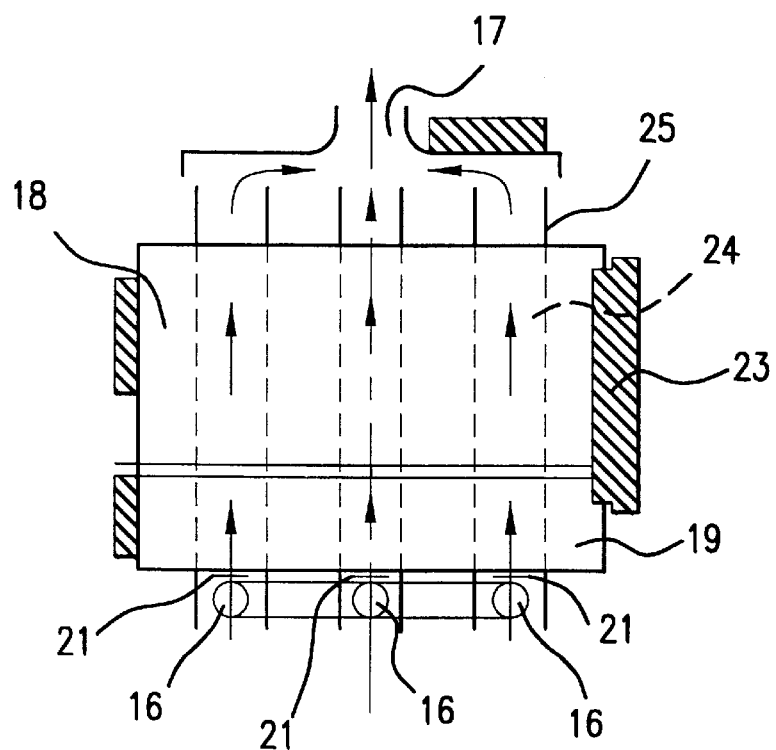
FIG. 2 is a lateral view of the boilerless steamer shown in FIG. 1.
Figure 3:
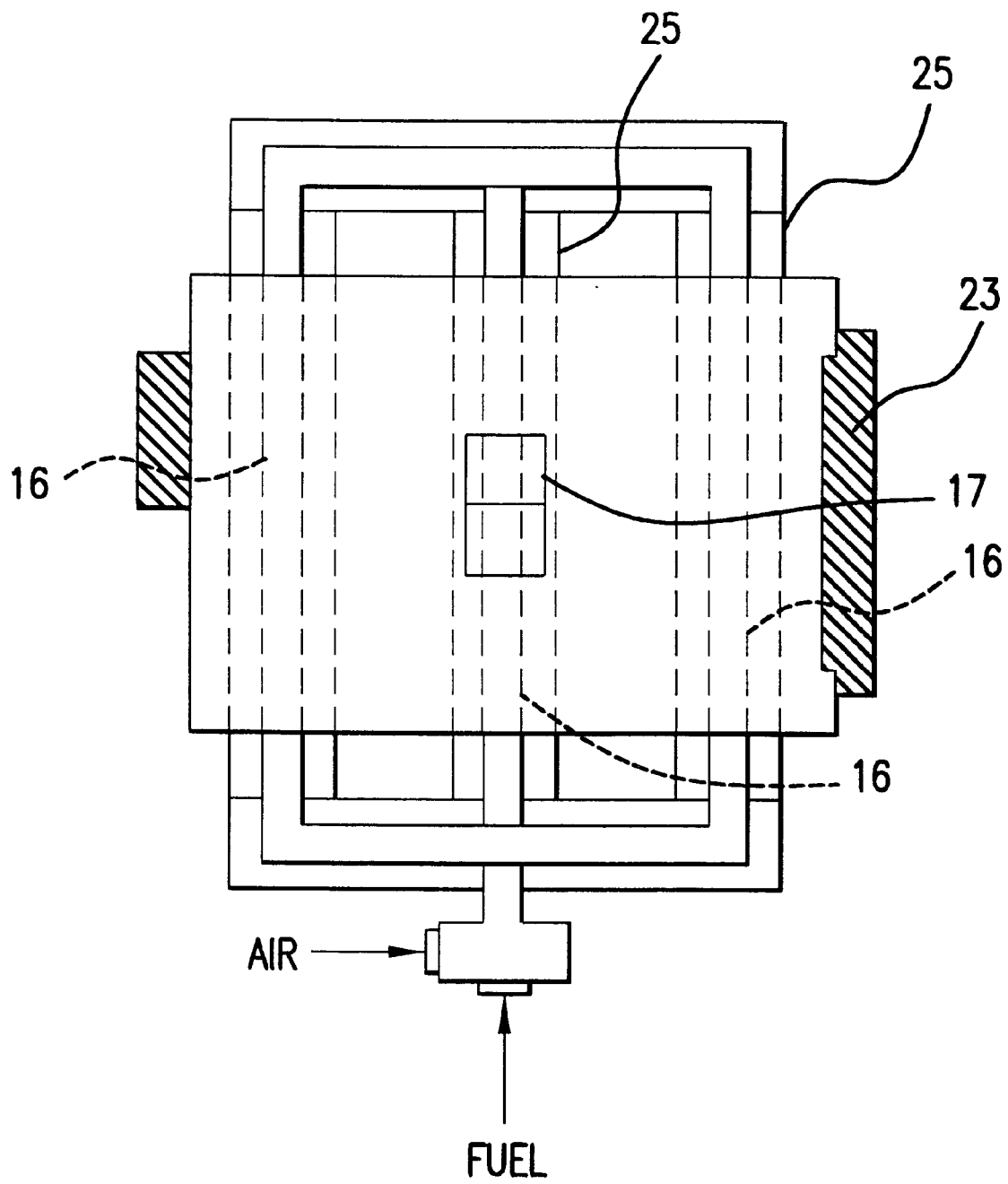
FIG. 3 is a top view of the boilerless steamer shown in FIG. 1.

In accordance with one particularly preferred embodiment of this invention, the exterior wall surface 13 of steam chamber 12 comprises guide means for directing the products of combustion from burners 16 to combustion products exhaust 17. In accordance with one embodiment, said guide means comprises a plurality of fins 25, as shown in FIGS. 2 and 3, disposed within annular space 15 and oriented so as to form at least one channel 24 for conveyance of the products of combustion. It will be apparent to those skilled in the art that fins 25 may be secured either to the interior wall surface 13 of housing 11 or the exterior wall surface 14 of steam chamber 12. It will also be apparent to those skilled in the art that any means suitable for forming products of combustion conduits may be employed and are deemed to be within the scope of this invention.

The method for producing steam in accordance with this invention comprises the steps of introducing water into a lower portion of a steam chamber disposed within a housing, burning a mixture of a fossil fuel and an oxidant in a portion of an annular region formed between the walls of the steam chamber and the housing walls and disposed beneath the bottom of the steam chamber, forming products of combustion and forming steam from the water in the lower portion of the steam chamber. Condensation of the steam is substantially prevented, preferably, by heating the walls of the steam chamber with the products of combustion. The products of combustion are then exhausted from the steamer housing. In accordance with one particularly preferred embodiment of this invention, the fossil fuel is natural gas.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. An apparatus comprising:

at least one outer wall forming a housing having a continuous bottom surface;

at least one inner wall disposed within said housing and forming a steam chamber having an interior wall surface and an exterior wall surface, whereby an annular space is formed between said exterior wall surface and said at least one outer wall;

at least one fossil fuel burner disposed within said annular space between a bottom of said steam chamber and said continuous bottom surface of said housing; and exhaust means for exhausting products of combustion generated by said at least one fossil fuel burner from said annular space.

2. An apparatus in accordance with claim 1, wherein said exhaust means comprises guide means for guiding said products of combustion from said at least one fossil fuel burner to contact said exterior wall surface of said steam chamber.

3. An apparatus in accordance with claim 1, wherein said outer wall forms an opening through which said products of combustion are exhausted from said annular space.

4. An apparatus in accordance with claim 3, wherein said exterior wall surface of said steam chamber forms at least one channel for guiding said products of combustion from said at least one fossil fuel burner through said opening.

5. An apparatus in accordance with claim 3 further comprising a plurality of fins disposed in said annular space, said plurality of fins arranged so as to form at least one conduit for guiding said products of combustion from said at least one fossil fuel burner through said opening.

6. An apparatus in accordance with claim 1, wherein said fossil fuel burner is a gaseous fuel burner.

7. An apparatus in accordance with claim 1, wherein at least one bluff body is disposed between said at least one gaseous fuel burner and said bottom of said steam chamber.

8. An apparatus for steaming food and producing steam comprising:

at least one housing wall forming a housing having a continuous bottom surface;

a steam chamber disposed within said housing and forming an annular space between said steam chamber and said housing wall;

at least one fossil fuel burner disposed within said annular space between a bottom of said steam chamber and said continuous bottom surface of said housing and oriented to produce steam in a bottom portion of said steam chamber; and heating means for heating substantially all of an exterior wall surface of said steam chamber.

9. An apparatus in accordance with claim 8, wherein said heating means is non-electric.

10. An apparatus in accordance with claim 8, wherein said heating means comprises guide means for guiding products of combustion generated by said at least one fossil fuel burner to contact said exterior wall surface of said steam chamber.

11. An apparatus in accordance with claim 10, wherein said guide means comprises at least one channel formed by said exterior wall surface of said steam chamber.

12. An apparatus in accordance with claim 10, wherein said guide means comprises a plurality of fins disposed in said annular space and arranged so as to form at least one conduit for guiding said products of combustion from said at least one fossil fuel burner to contact said exterior wall surface of said steam chamber and through an opening formed by said at least one housing wall in a top part of said housing.

13. An apparatus in accordance with claim 8, wherein said at least one housing wall forms at least one opening through which products of combustion generated by said at least one fossil fuel burner are exhausted.

14. An apparatus in accordance with claim 8, wherein said at least one fossil fuel burner is a gaseous fuel burner.

15. An apparatus in accordance with claim 8 further comprising at least one bluff body disposed in said annular space between said at least one fossil fuel burner and a bottom of said steam chamber.

16. An apparatus in accordance with claim 8, wherein said heating means comprises at least one electrical heating tape in contact with said exterior wall surface of said steam chamber.

17. In a boilerless steamer comprising a steamer housing and a steam chamber disposed within said steamer housing and forming an annular region between said steamer housing and said steam chamber, a method for producing steam comprising the steps of:

introducing water into a lower portion of said steam chamber;

burning a mixture of a fossil fuel and an oxidant in said annular region in a portion of said housing disposed beneath a bottom of said steam chamber, forming products of combustion and forming steam from said water in said lower portion of said steam chamber;

contacting said exterior wall surface of said steam chamber with said products of combustion resulting in heating of said exterior surface to a temperature sufficient to prevent condensation of said steam; and exhausting said products of combustion from said steamer housing.

18. A method in accordance with claim 17, wherein said fossil fuel is a gaseous fuel.

19. A method in accordance with claim 18, wherein said fossil fuel is natural gas.

* * * * *